United States Patent
Robison et al.

(10) Patent No.: US 7,125,052 B2
(45) Date of Patent: Oct. 24, 2006

(54) CRIMPED GAS RISER WITH JACKET ASSEMBLY

(75) Inventors: David L. Robison, Madison, OH (US); Jason Knaus, Euclid, OH (US)

(73) Assignee: Perfection Corporation, Madison, OH (US)

(*) Notice: Subject to any disclaimer, the term of this patent is extended or adjusted under 35 U.S.C. 154(b) by 0 days.

(21) Appl. No.: 10/377,431

(22) Filed: Feb. 28, 2003

(65) Prior Publication Data
US 2003/0214133 A1 Nov. 20, 2003

Related U.S. Application Data

(60) Provisional application No. 60/380,605, filed on May 15, 2002.

(51) Int. Cl.
*F16L 21/00* (2006.01)

(52) U.S. Cl. ........... 285/256; 285/148.13; 285/382; 285/55

(58) Field of Classification Search ........... 285/148.13, 285/148.17, 239, 240, 241, 243, 256, 307, 285/322, 382, 55
See application file for complete search history.

(56) References Cited

U.S. PATENT DOCUMENTS

| | | | |
|---|---|---|---|
| 3,819,207 A * | 6/1974 | Leopold, Jr. ............ 285/148.13 |
| 3,987,820 A | 10/1976 | Alewitz | |
| 4,085,950 A | 4/1978 | Alewitz | |
| 4,229,025 A * | 10/1980 | Volgstadt et al. ............ 285/242 |
| 4,279,435 A | 7/1981 | Alewitz | |
| 4,407,526 A * | 10/1983 | Cicenas ......................... 285/27 |
| 4,445,714 A * | 5/1984 | Kisiel, III .................... 285/23 |
| 4,482,170 A * | 11/1984 | Jacobson et al. ........ 285/148.13 |
| 4,712,813 A * | 12/1987 | Passerell et al. ............ 285/250 |
| 5,326,137 A | 7/1994 | Lorenz et al. | |
| 5,590,914 A | 1/1997 | Platner et al. | |
| 5,934,711 A | 8/1999 | Gady | |
| 6,142,538 A * | 11/2000 | Volgstadt et al. ........... 285/323 |
| 6,371,525 B1 | 4/2002 | Passerell et al. | |

FOREIGN PATENT DOCUMENTS

WO  WO 98/44285  10/1998

* cited by examiner

*Primary Examiner*—Aaron Dunwoody
(74) *Attorney, Agent, or Firm*—Fay, Sharpe, Fagan, Minnich & McKee, LLP

(57) ABSTRACT

A riser assembly is provided for transmitting gas from a buried line to a meter manifold. The riser assembly includes an adapter having a mounting structure at one end for connection to a manifold and having an opening at an opposite end. An inner casing has a first end received through the opening and a second end extending therefrom for connection with an associated buried line. A seal assembly is interposed between the inner casing and the adapter for sealing therebetween. A gripping assembly holds the inner casing in the adapter. A protective tubular assembly is received over the inner casing. The tubular assembly has a first end received in the opening and a second end extending therefrom a dimension sufficient to cover the inner casing above ground. The protective tubular assembly includes a steel liner received over the inner casing for protecting the inner casing, an anticorrosive coating received on the steel liner and a plastic jacket received over the coating and the liner for providing a protective barrier thereto.

20 Claims, 4 Drawing Sheets

CRIMPED GAS RISER WITH JACKET ASSEMBLY

This application claims the benefit of and hereby expressly incorporates herein by reference U.S. Provisional Patent Application No. 60/380,605, filed May 15, 2002.

BACKGROUND OF THE INVENTION

The present invention relates to gas transmission assemblies. More particularly, it relates to gas risers used in transmitting natural gas from a buried underground gas line to a home or business.

U.S. Pat. No. 5,590,914 is commonly owned by the assignee of the present application and the details of that patent are incorporated herein by reference. It generally illustrates a prior art gas riser assembly of the type to which the subject invention pertains where natural gas is supplied from a main, through a buried service line, and eventually to the riser assembly. The riser assembly extends from an underground connection with the service line, through an elbow region, to a vertically disposed pipe that communicates with a manifold of an above-ground gas meter.

The prior art gas riser assembly includes a double-walled conduit comprising an inner, plastic tube or casing received inside a rigid, outer casing. The inner casing defines the fluid passage for the gas as it is transported from the service line to the manifold. The riser assembly is connected to the manifold in a fluid tight manner so that a sealed passageway is provided from the underground connection with the service line to the manifold.

Strength of the riser is an important consideration. It must be strong enough to support the weight load of the residential piping system, while maintaining a sealed relationship with the manifold. It is also preferred that the assembly be electrically isolated from ground contact. Additionally, it is desirably to use corrosion-free material in the riser assembly since the outer casing, which is typically made of steel, is otherwise subject to corrosive attack. For this reason the outer casing is usually treated, i.e., coated, to prevent corrosion.

One problem with prior riser assemblies is the degradation of the coating material prior to installation. Risers are typically stored loosely in installation vehicles for days, even weeks at a time. During this time the riser may easily be subjected to collision with other objects in the storage area. These collisions may undesirably damage or weaken the anticorrosive coating, creating an increased likelihood of corrosion at or near the areas of impact.

Thus, there is a desire for a new and improved riser assembly that overcomes the foregoing difficulties and others while producing better and more advantageous overall results. The new and improved riser assembly should be corrosion resistant, durable, isolated from electrical ground contact, and strong enough to support the weight load of residential piping assembly resulting in an extended service life.

SUMMARY OF THE INVENTION

In accordance with one aspect of the present invention, a riser assembly is provided for transmitting gas from a buried line to a meter manifold. More particularly, in accordance with this aspect of the invention, the riser assembly includes an adapter having a mounting structure at one end for connection to a manifold and having an opening at an opposite end. An inner casing has a first end received through the opening and a second end extending therefrom for connection with an associated buried line. A seal assembly is interposed between the inner casing and the adapter for sealing therebetween. A gripping assembly holds the inner casing in the adapter. A protective tubular assembly is received over the inner casing. The tubular assembly has a first end received in the opening and a second end extending therefrom a dimension sufficient to cover the inner casing above ground. The protective tubular assembly includes a steel liner received over the inner casing for protecting the inner casing, an anticorrosive coating received on the steel liner and a plastic jacket received over the coating and the liner for providing a protective barrier thereto.

In accordance with another aspect of the present invention, a riser assembly is provided for transmitting gas from a buried line to a meter manifold. More particularly, in accordance with this aspect of the invention, the riser assembly includes an adapter having a passageway extending from a first end to a second end of the adapter. The passageway is defined by a plurality of cylindrical surfaces. A stiffener is received in the passageway and has a radial shoulder with a diameter greater than the diameter of one of the plurality of surfaces located adjacent the first end of the adapter thereby preventing the stiffener from axially moving along said one of the plurality of surfaces. The stiffener further has a tubular portion that extends outwardly from the radial shoulder toward the second end of the adapter. An inner casing has a first end that receives the tubular portion and abuts the radial shoulder in the adapter and a second end spaced from the first end for connecting the adapter to an associated buried line. A steel liner is received over the inner casing and has a first end received in the adapter and a second end spaced from the first end a distance sufficient to cover the inner casing outside the adapter and above ground. A polyethylene jacket is formed over the steel liner from the adapter to at least the ground for protecting the steel liner from impact damage.

In accordance with yet another aspect of the present invention, a method of assembling a riser is provided. More particularly, in accordance with this aspect of the present invention, the riser has an adapter with a mounting structure at one end for connection to a manifold and has an opening at an opposite end. An inner casing has first and second ends. A protective tubular assembly includes a steel liner and a plastic jacket received over the steel liner. A gripping assembly is provided for holding the inner casing in the adapter. The method includes the steps of the first end of the inner casing being inserted through the tubular assembly. The first end of the inner casing is inserted into the adapter opening. The gripping assembly is inserted into the adapter opening to hold the inner casing in the adapter opening. The tubular assembly is inserted into the adapter opening. The adapter and the tubular assembly are secured together.

BRIEF DESCRIPTION OF THE DRAWINGS

The invention may take physical form in various components and arrangements of components and in various steps and arrangements of steps. The drawings are only for purposes of illustrating a preferred embodiment of the present invention and are not to be construed as limiting the invention.

DETAILED DESCRIPTION OF THE PREFERRED EMBODIMENT

Figure 1:
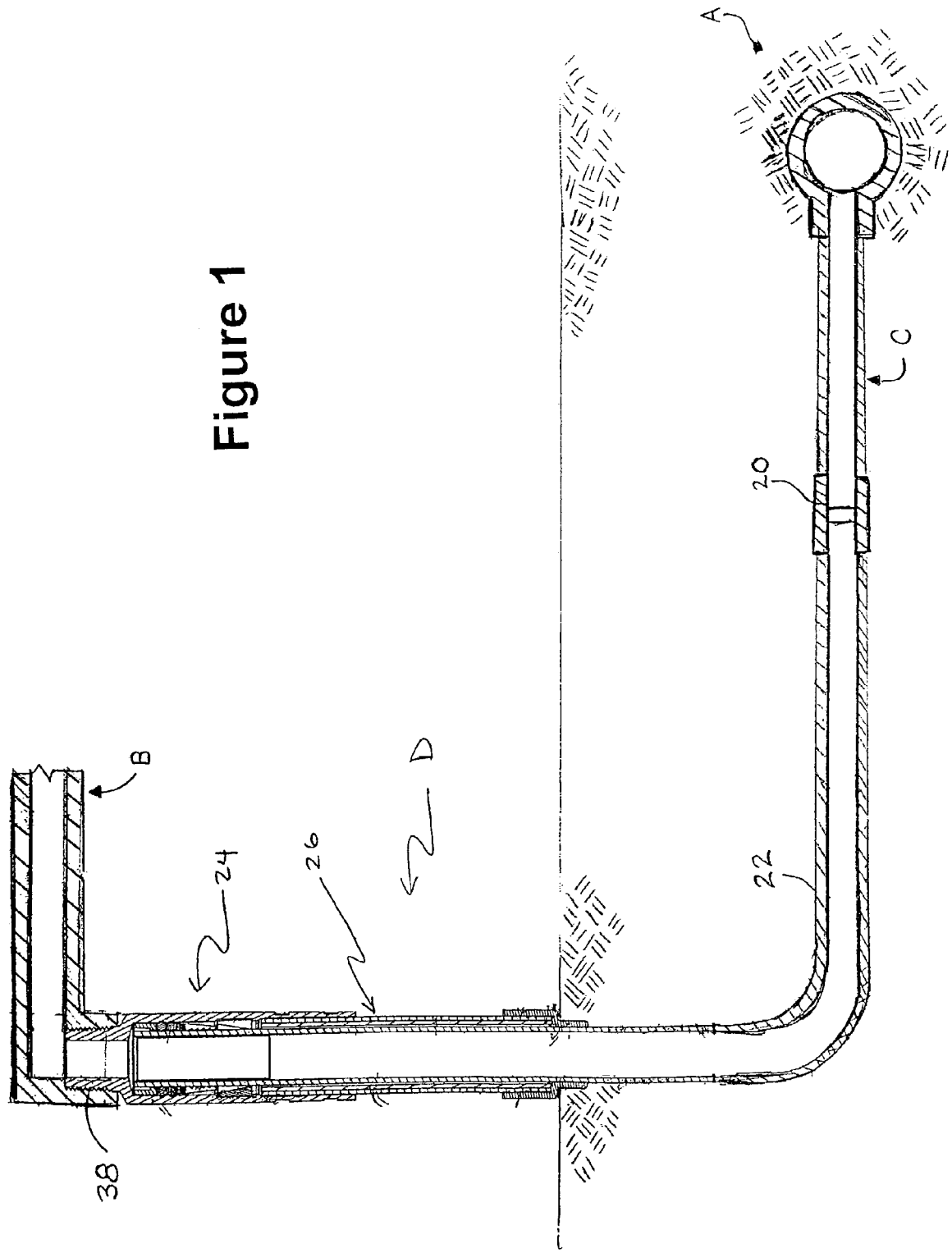
FIG. 1 is a schematic cross-sectional representation of the natural gas distribution system from main to meter including a gas riser assembly with a protective jacket assembly in accordance with a preferred embodiment of the present invention.

Referring now to the drawings wherein the showings are for the purposes of illustrating a preferred embodiment of the invention only and not for purposes of limiting the same, FIG. 1 shows a main gas supply line or gas main A that communicates with a manifold or meter bar B associated with a residential or commercial establishment via a buried line C and a gas riser assembly D. More particularly, natural gas or the like is supplied from the main A to a first end of the buried service line C. A second end of the buried service line is connected to the gas riser assembly D by a conventional coupling 20, such as a stab type coupling. The coupling 20 can be a separate component or, alternatively, the coupling 20 may be formed integrally with either the buried service line C or the gas riser assembly D. The gas riser assembly D directs supplied natural gas from the buried service line C to the manifold B. A shutoff valve (not shown) and/or a pressure reducer (not shown) may be operatively positioned between the gas riser assembly D and the manifold B if so desired.

Figure 2:
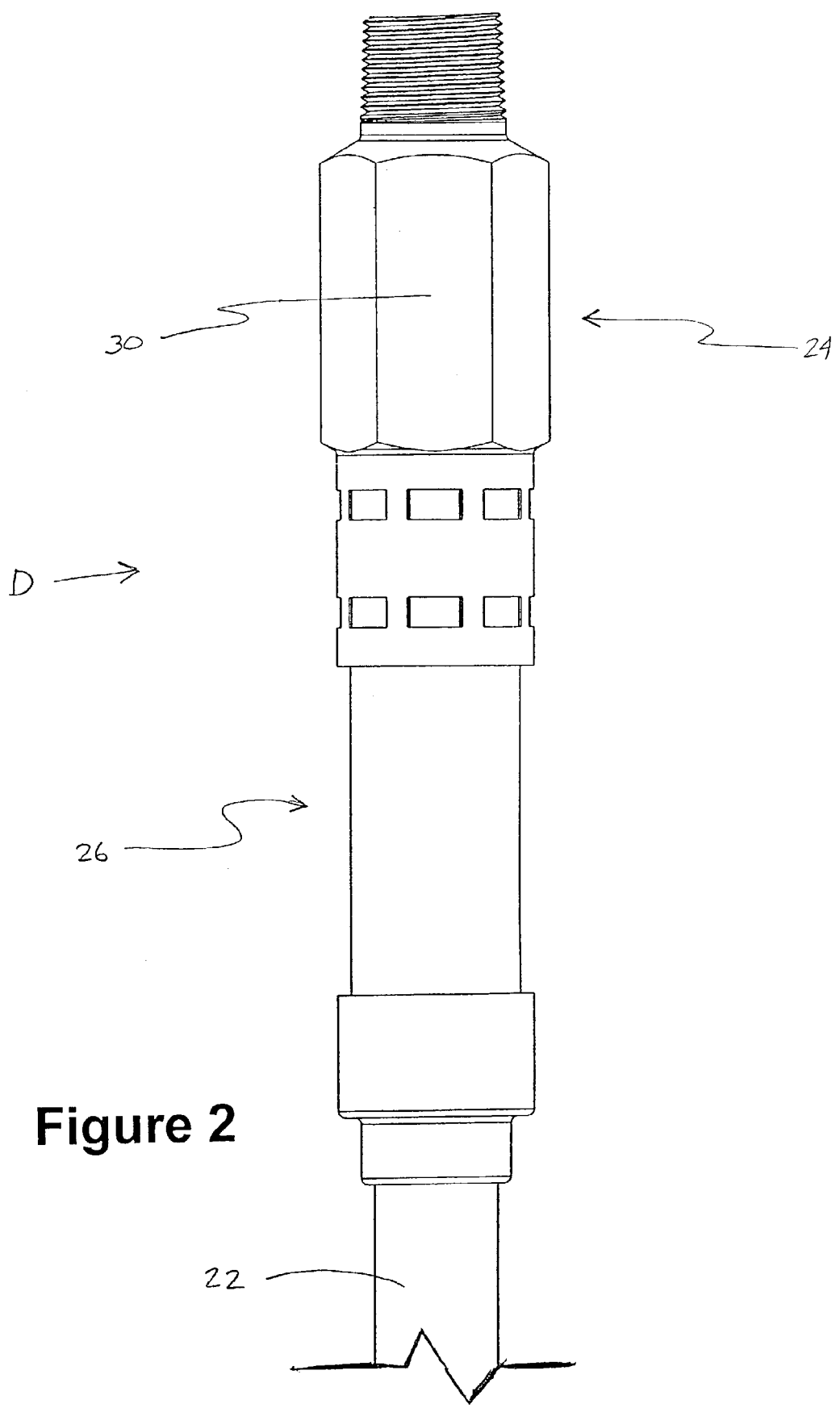
FIG. 2 is a partial elevational view of the gas riser assembly of FIG. 1 illustrating an inner casing, an adapter head and the protective jacket assembly.

With additional reference to FIG. 2, the gas riser assembly D comprises a plastic inner conduit 22, an adapter head assembly 24, and a protective tube assembly 26. With additional reference to FIG. 3, the inner casing or conduit 22 is hollow and tubular defining a conduit passageway 28 along its longitudinal extent. Further, the inner conduit 22 is generally bent and L-shaped (FIG. 1) for directing and transmitting supplied gas from the buried line C upward and out of the ground toward the above-ground manifold B. The conduit 22 sealingly connects to an adapter 30 of the adapter head assembly 24 as will be discussed in further detail below.

Figure 3:
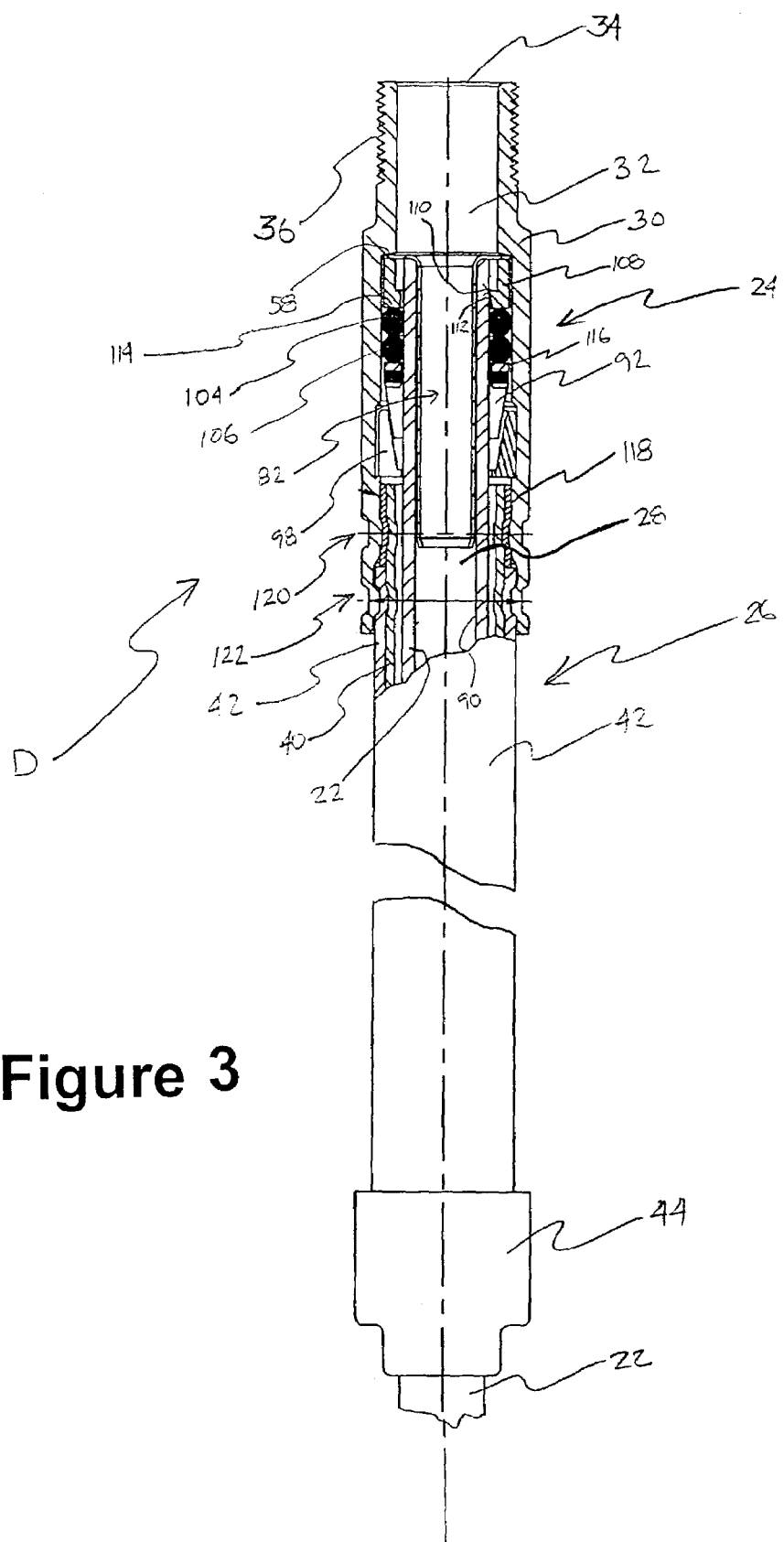
FIG. 3 is a partial elevational cross-sectional view of the gas riser assembly of FIG. 1.

With specific reference to FIGS. 1 and 3, the adapter 30, also referred to herein as a service head adapter and an adapter head, includes an adapter passageway 32 that is in communication with the conduit passageway 28 when the conduit 22 is attached thereto. The adapter 30 also includes a first opening 34 at one end in communication with the adapter passageway 32 and a second opening 78 at an opposite end in communication with the passageway 32. Together, the conduit passageway 28 and the adapter passageway 32 form a continuous riser passageway 28,32 extending from the buried end of the inner casing 22 to the first opening 34. A mounting structure including exterior threads 36 is disposed on the adapter 30 adjacent the first opening 34 for connecting or mounting the riser assembly D to the manifold B in a conventional manner. The manifold B includes a threaded opening 38 for receiving the exterior threads 36 of the adapter 30. The exterior threads 36 may be NPT (National Pipe Tapered) type threads for sealing engagement with the manifold B. Alternatively, the connection between the riser assembly D and the manifold B can be any other suitable type of connection and utilize any other suitable sealing method. The inner casing 22 has a first end received through the second opening 78 of the adapter 30 and a second end extending therefrom that connects to the burred line C.

The protective tube assembly 26 is annularly disposed on or received over the conduit 22 from the adapter assembly 24 to at least ground level. More specifically, the protective tube assembly 26 has a first end received in the second opening 78 of the adapter 30 and a second end extending therefrom a dimension sufficient to cover the inner casing 22 above ground. Thus, the protective tube assembly 26 could be contiguous with or extend into the ground but could not be abbreviated such that any portion of the conduit 22 that is above ground would be exposed. The protective tubular assembly 26 includes (1) a protective liner 40 outside of and annularly adjacent the conduit 22 for suitably protecting the conduit 22 and (2) a jacket 42 outside of and annularly adjacent the liner 40. Thus, the liner 40 is received over the inner casing 22 and positioned between the conduit 22 and the jacket 42. A collar or moisture seal 44 axially spaced from the adapter 30 on the inner conduit 22 has inwardly extending protrusions or teeth (not shown) engaged with the jacket 42 for securing the liner 40 and the jacket 42 to the conduit 22. The collar 44 can be a rubber slip seal connected to the inner conduit 22 by an interface fit, i.e., the inner diameter of the collar 44 is slightly smaller than the outside diameter of the conduit 22. The protective liner 40 and the jacket 42 are axially held in position between the adapter 30 and the collar 44.

The protective liner 40 can be made of steel, particularly, where steel is required to suitably protect any gas transmitting plastic conduit extending above ground. Of course, it is well known that steel liners, such as steel liner 40, are often used to provide protection and strength to the riser assembly D. Further, it is well known to provide such steel liners with an anticorrosion coating received thereon, such as a fusion bonded coating or any other corrosion resistive coating. Heretofore, prior art steel liners having anticorrosive coatings were not provided with an outer casing, such as the jacket 42. As a result, the applied coatings were exposed and susceptible to impact damage, particularly prior to installation during shipping and handling of the riser assemblies. Impact damage is known to cause degradation and/or failure of anticorrosion coatings.

To prevent degradation and/or failure of the applied coatings, the riser assembly D of the present invention includes the jacket or outer casing 42 received over steel liner 40 and its anticorrosive coating thereby providing a protective barrier for the steel liner 40 and the coating. The jacket 42 can be a polyethylene material and formed by an extrusion process. In a preferred process, the extruded polyethylene jacket 42 is installed over the steel liner 40 as it is extruded or very soon after extrusion. With immediate or relatively quick application, the outer casing 42 is still warm from the extrusion process, i.e., the jacket 42 is at a temperature greater than about 110 degrees Fahrenheit. As the applied jacket 42 is allowed to cool, it will shrink onto the steel liner 40 thereby providing a line-to-line or shrink-fit. The cooled outer plastic jacket 42 is then able to provide protection, including impact protection, to the steel liner 40 and any anti-corrosion or other coatings and the like applied thereon.

Figure 4:
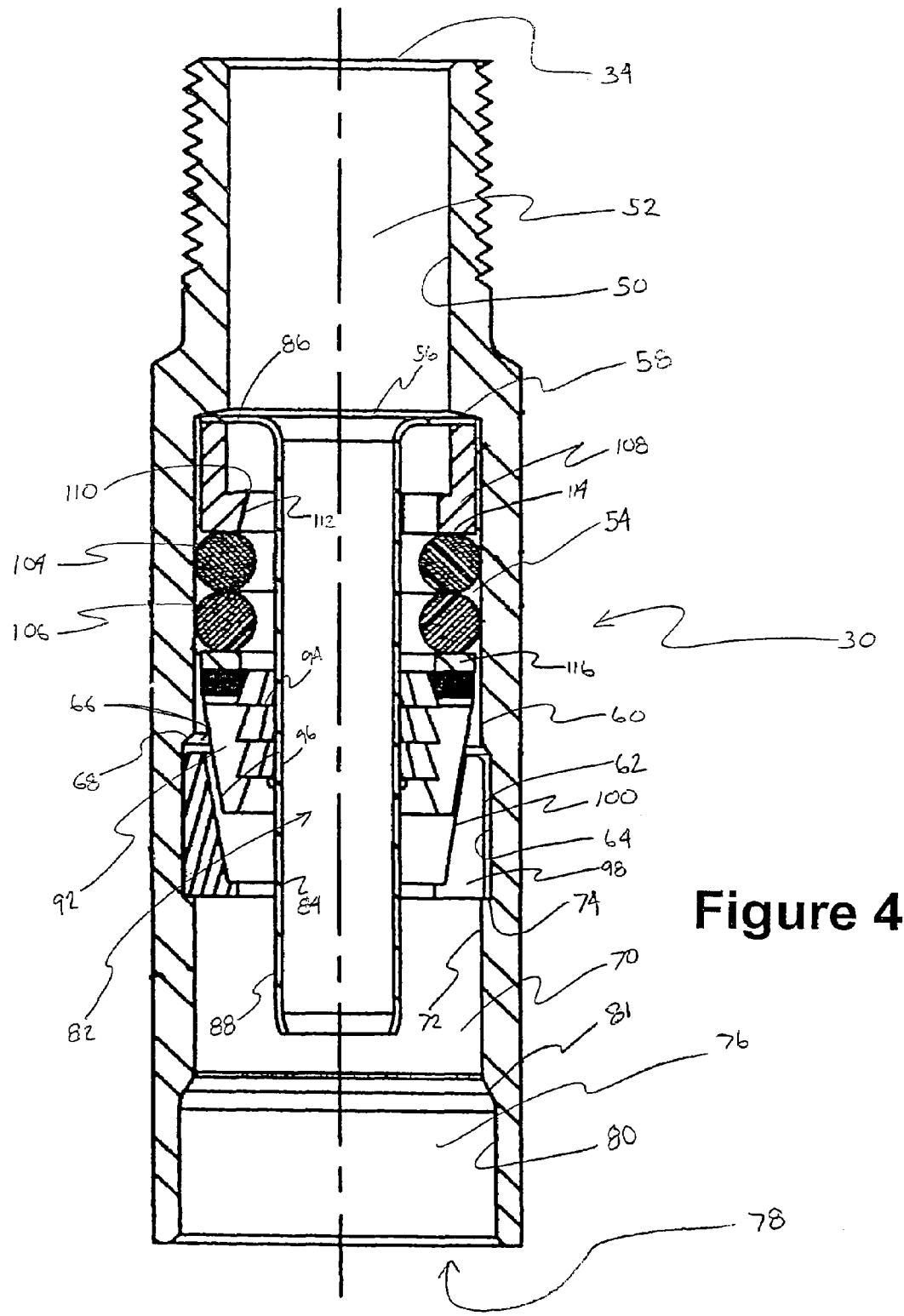
FIG. 4 is an enlarged, mirrored cross-sectional view of the adapter head of FIG. 2 shown prior to the inner casing and protective jacket assembly being installed therein and the adapter head being crimped.

With reference to FIG. 4, the adapter head 30 includes a plurality of interconnected volumes or regions. A first cylindrical surface 50 adjacent the first opening 34 defines a first cylindrical region 52. A second cylindrical region 54 is disposed farther inward relative to the first opening 34. The second cylindrical region 54 is diametrically larger than the first cylindrical region 52 and is connected thereto by a first frustoconical region 56 defined by a first cylindrical tapered surface 58. The second region 54 is defined by a second cylindrical surface 60. Continuing away from the first opening 34, another or third cylindrical region 62 defined by a third cylindrical surface 64 that is diametrically larger than the second cylindrical region 54 is provided. The third cylindrical region 62 is connected to the second cylindrical region 54 by a second frustoconical region 66 that is defined by a second cylindrical tapered surface 68. A fourth cylindrical region 70 defined by a fourth cylindrical surface 72 is adjacent the third cylindrical region 62. The fourth region 70 is diametrically larger than the third region 62 thereby defining a radial edge 74 between the regions 62,70. A fifth cylindrical region 76 defines a second opening 78 at a second, opposite end of the adapter 30. The fifth region 76 is defined by a fifth cylindrical surface 80. A contoured and tapered surface 81 connects the fourth and fifth regions 70,76. Through the regions, the first opening 34 is in communication with the second opening 78 forming the adapter passageway 32.

With reference to FIGS. 3 and 4, a hollow stiffener 82 is received within the passageway 32 of the adapter 30. The stiffener 82 includes an elongated tubular portion 84 and a radial shoulder portion 86 at one end of the tubular portion 84. The stiffener 82 is positioned in the adapter 30 such that the radial shoulder portion 86 rests against the frustoconical surface 58 that separates the first cylindrical surface 50 from the second cylindrical surface 60. The radial should portion 86 has a diameter greater than the diameter of the first surface 50 which prevents the shoulder portion 86 of the stiffener 82 from axially moving along the first surface 50. Thus, the surface 58 defines the maximum axial extent that the shoulder portion 86 can be inserted into the adapter 30.

The tubular portion 84 extends outwardly from the shoulder portion 86 toward the second opening 78 of the adapter 30. The conduit 22 extends into the second opening 78 of the adapter 30 and mates with the tubular portion 84 of the stiffener 82. More specifically, the first end of the inner conduit 22 receives the tubular portion 84 and abuts the radial shoulder portion 86. The shoulder portion 86 limits the axial extent to which the first end of the conduit 22 can be inserted into the adapter 30. The first end of the conduit 22 protrudes or extends outwardly of the protective assembly 26. Thus, the conduit 22 extends into the adapter 30 farther than does the protective assembly. The tubular portion 84 of the stiffener 82 extends into the conduit a length or dimension sufficient such that the tubular portion 84 also extends into the protective assembly 26. Thus, the tubular portion 84 extends into the conduit 22 along a portion of the conduit that is not covered by the protective assembly 26. The insertion of the tubular portion 84 into the conduit 22 does not significantly adversely affect fluid passage through the conduit 22 and the adapter 30, but provides increased rigidity to the conduit 22 adjacent an inserted end thereof. An external surface 88 of the tubular portion 84 is preferably received in the inner casing 22 in close sealing engagement therewith to inhibit passage of fluid between the tubular portion 84 and an inner surface 90 of the conduit 22.

The adapter head assembly 24 further includes a gripping assembly also received within the second opening 78 of the adapter 30 for securing or holding the conduit 22 therein. A preferred gripping assembly includes a collet member 92 having an internal toothed profile 94 and an outer tapered surface 96 and a wedge member 98 having an internal tapered surface 100 that is complimentary to the outer tapered surface 96 of the collet member 92. The axial position of the wedge member 98 is generally fixed within the third region 62 and maintained within that region 62 by the radial edge 74 and the radially tapered surface 68. The collet member 92 and the wedge member 98 cooperate to prevent pullout of the conduit 22 from the adapter 30. More specifically, any axial pullout force imposed on the conduit 22 causes the outer tapered surface 96 of the collet 92 to bear against the surface 100. This consequently causes radial constriction of the collet 92 about the conduit 22 and, thus, the pullout force is resisted by the cooperating action between the wedge member 98 and the collet 92 which tightly grips an external surface of the conduit 22.

A seal assembly is inwardly disposed relative to the collet member 92 and is defined by a first and second seal members 104, 106 interposed between the conduit 22 and the adapter 30 for sealing between. Each seal member 104, 106 is a resilient O-ring that provides a sealed relationship between the external surface of the conduit 22 and the second cylindrical surface 60. The relationship of the seal members 104, 106 to the conduit 22 and the surface 60 is such that when the conduit 22 is inserted into the second opening 78, the seals 104, 106 are slightly compressed between the outer surface of the conduit 22 and the cylindrical surface 60 of the adapter 30. The seals 104, 106 prevent passage of fluid therepast in either axial direction between the outer surface of the conduit 22 and the adapter 30.

Moreover, the gripping assembly further includes a retaining and spacing member, such as gripping ring 108, that is disposed inwardly of the O-rings 104, 106. The ring 108 serves as a spacer and also acts to grip the external surface of the conduit 22. The gripping ring 108 includes at least one, and preferably a plurality of radially inwardly directed bite teeth 110 that engage the outer surface of the inner conduit or casing 22 in an interference fit. Upon attempted withdrawal of the conduit 22 from the adapter 30, the teeth 110 cause the entire stiffener assembly 82-88 to move axially with the conduit 22 which results in the conduit 22 being more firmly gripped by the collet 92.

As a spacer, the gripping ring 108 shifts the seals 104, 106 and the collet 92 axially outward, i.e., toward the second opening 78, so that these components are operatively positioned for coupling and sealing operations as described herein. The gripping ring 108 preferably includes a chamfered surface 112 that converges radially inwardly to facilitate insertion of the conduit 22 fully into the adapter 30. The gripping ring 108 further includes an axially outward facing planar thrust surface 114 that engages one or more of the seals 104, 106. The thrust surface 114 eliminates the necessity of a separate thrust washer axially between the gripping ring 108 and the seals 104, 106.

A thrust washer 116 is, however, provided axially between the seals 104, 106 and the collet 92 to prevent movement of the seals 104, 106 into the gripping portion of the collet 92 which could result in seal damage. Alternatively, a thrust surface could be formed on an inner axial end of the collet 92.

The riser assembly D can further include a crimp connection between the adapter 30 and the protective tubular assembly 26 that prevents pullout of the protective assembly 26 from the adapter 30. The crimp connection includes a first crimp or crimp region 122 adjacent the second opening 78 of the adapter 30. A portion of the adapter indents or extends radially into the jacket 42 to form the first crimp 122. A portion of the liner 40 extends axially into the adapter 30 beyond the axial extent to which the jacket 42 extends into the adapter 30. A crimp ring or tube 118 is received over and annularly around the portion the liner 40 that protrudes beyond the end of the jacket 42. The crimp connection further includes a second crimp or crimp region 120 positioned inwardly of the first crimp 122 relative to the second opening 78. Another portion of the adapter 30 indents or extends radially into the crimp ring 118 which snugly squeezes the steel liner 40.

The entire riser assembly D can be factory assembled as described below. In this manner, the entire assembled riser D is able to be shipped for use in the field and the only required connections in the field are connecting the buried end of the conduit 22 to the buried service line C and connecting the adapter 30 to the manifold B. During shipping, the liner 40 and its coating are protected from impact damage by the jacket 42.

To assemble the riser assembly D, the adapter 30 is sub-assembled by loading the stiffener and the gripping and sealing assemblies therein. The jacket 42 is applied to the steel liner 40 and its anticorrosive coating in the manner described above. The first end of the inner casing 22 is then inserted through the collar 44 and the protective assembly 26 and inserted into the second opening 78 of the adapter 30. More specifically, the tubular portion 84 of the stiffener 82 is received in the first end of the conduit 22 and the conduit 22 is seated against the radial shoulder 86 of the stiffener 82. The seals 104, 106 engage the conduit outer surface and the adapter second cylindrical surface 60 to prevent the escape of fluid from the connected adapter 30 and conduit 22. Positioned annularly on the conduit 22, the protective liner 40 and the outer casing 42 are then inserted into the second opening 78 of the adapter 30.

With reference to FIGS. 3 and 4, the adapter 30 and the tubular assembly 26 are then secured together. More specifically, the adapter 30 is crimped about the protective liner 40 and the jacket 42 by a crimping die such as a hardened steel crimping die to create a crimp connection. In the preferred embodiment, the crimp ring 118 is positioned along the exposed section of the liner 40 that protrudes from the end of the outer casing 42 prior to the conduit 22 and the protective assembly 26 being inserted into the adapter 30 and prior to the adapter 30 being crimped about the liner 40 and the jacket 42. The crimp ring may be constructed of steel and is used to insure that a strong connection is obtained by the crimping process. As described above, the crimping process creates first and second crimps 120, 122 as the crimp die is hydraulically closed along a taper. The first crimp 122 deflects and slightly indents the adapter into at least jacket 42 thereby securing the adapter 30 to the jacket 42. The second crimp 120 deflects and slightly indents the adapter 30 into at least the crimp ring 118 which tightens the crimp ring 118 around the liner 40 thereby securing the adapter 30 to the liner 40. Additionally, the collar 44 is positioned on the conduit 22 to retain the tubular assembly 26 in the adapter 30 and secure the tubular assembly 26 to the conduit 22. The collar 44 is held in position by its interference fit with the conduit 22.

Attempted withdrawal of the conduit 22 from the second opening 78 causes limited axial outward movement of the stiffener 82, due to the engagement of the gripping ring 108 on the conduit 22. The thrust surface 114 acts on the seals 104, 106 which correspondingly act on the thrust washer 116 so that the seals 104, 106 and the collet 92 move axially outward toward the second opening 78. As previously described, this causes the collet tapered outer surface 96 to bear against the inner tapered surface 100 of the wedge member 98. The wedge member 98 is axially restricted by the radial edge 74. The cooperation between the collet 92 and the wedge member 98 causes the collet 92 to become radially constricted and, subsequently, the collet 92 bitingly engages the outer surface of the conduit 22. Upon maximum radial constriction of the collet 92, as limited by its construction and the outer diameter of the conduit 22, further axial outward movement of the conduit 22 is prevented.

The invention has been described with reference to a preferred embodiment. Obviously, modifications and alterations will occur to others upon reading and understanding the preceding detailed description. It is intended that the invention be construed as including all such modifications and alterations insofar as they are within the scope of the appended claims or the equivalents thereof.

Having thus described the preferred embodiment(s), the invention is now claimed to be:

1. A riser assembly for transmitting gas from a buried line to a meter manifold, the riser assembly comprising:
    an adapter having a mounting structure at one end for connection to a manifold and having an opening at an opposite end;
    an inner casing having a first end received through the opening and a second end extending therefrom for connection with an associated buried line;
    a seal assembly interposed between the inner casing and the adapter for sealing therebetween;
    a gripping assembly holding the inner casing in the adapter;
    a protective tubular assembly received over the inner casing and having a first end received in the opening and a second end extending therefrom a dimension sufficient to cover the inner casing above ground, the protective tubular assembly including:
        a steel liner received over the inner casing for protecting the inner casing;
        an anticorrosive coating received on the steel liner; and
        a plastic jacket received over the coating and the liner for providing a protective barrier thereto; and
    a crimp connection between the adapter and the protective assembly that includes the adapter extending radially into the plastic jacket for preventing pullout of the protective assembly from the adapter by the adapter, wherein the crimp connection includes a first crimp adjacent the opening of the adapter having a portion of the adapter extending radially into the plastic jacket.

2. The riser assembly of claim 1 wherein a portion of the steel liner extends into the adapter beyond the extent to which the plastic jacket extends into the adapter and the crimp connection further includes:
    a crimp ring received over said portion of the steel liner; and
    a second crimp positioned inwardly of the first crimp relative to the opening, the second crimp having a second portion of the adapter extending radially into the crimp ring.

3. The riser assembly of claim 1 wherein the protective tubular assembly further includes:
    a collar axially spaced from the adapter on the inner casing for securing the steel liner and the plastic jacket to the inner casing.

4. The riser assembly of claim 3 wherein the collar includes inwardly extending protrusions for engaging at least the plastic jacket.

5. The riser assembly of claim 3 wherein the collar is a rubber slip seal that secures the plastic jacket and steel liner through an interference fit.

6. The riser assembly of claim 1 wherein the plastic jacket is constructed of a polyethylene material that protects the steel liner and coating from impact damage.

7. The riser assembly of claim 1 wherein the plastic jacket is shrink-fit onto the liner and coating.

8. The riser assembly of claim 1 wherein at least one of the coating and the plastic jacket provides dielectric properties.

9. The riser assembly of claim 1 further including a stiffener received within the first end of the inner casing.

10. The riser assembly of claim 1 wherein the inner casing extends outwardly from the first end of the protective assembly and a stiffener is received in the inner casing a dimension sufficient to extend at least partially into the protective assembly.

11. The riser assembly of claim 1 wherein the gripping assembly includes an internally toothed collet having a tapered external surface that cooperates with a wedge member for gripping the inner casing upon imposition of an axial pullout force.

12. The riser assembly of claim 1 wherein the adapter mounting structure includes external threads.

13. The riser assembly of claim 1 wherein the plastic jacket is extruded directly onto the liner and the coating and shrinks thereonto as the jacket cools.

14. A riser assembly for transmitting gas from a buried line to a meter manifold, the riser assembly comprising:
 an adapter having a passageway extending from a first end to a second end of the adapter, the passageway defined by a plurality of cylindrical surfaces;
 a stiffener received in the passageway and having a radial shoulder with a diameter greater than a diameter of one of the plurality of surfaces located adjacent the first end of the adapter thereby preventing the stiffener from axially moving beyond said one of the plurality of surfaces, the stiffener further having a tubular portion that extends outwardly from the radial shoulder toward the second end of the adapter;
 an inner casing having a first end that receives the tubular portion and abuts the radial shoulder of the stiffener in the adapter and a second end spaced from the first end for connecting the adapter to an associated buried line;
 a steel liner received over the inner casing and having a first end received in the adapter and a second end spaced from the first end a distance sufficient to cover the inner casing outside the adapter and above ground; and
 a polyethylene jacket formed over the steel liner from the adapter to at least the ground for protecting the steel liner from impact damage;
 wherein the adapter is crimped onto at least one of the jacket, the liner, and a crimp ring positioned between the liner and the adapter at a location generally adjacent the second end of the adapter.

15. The riser assembly of claim 14 wherein the steel liner includes a coating that protects the steel liner from corrosion.

16. The riser assembly of claim 14 wherein the tubular portion of the stiffener assembly extends into the first end of the steel liner.

17. The riser assembly of claim 14 wherein the jacket is extruded directly on the liner so that when the extruded jacket cools on the liner a shrink fit is achieved between the jacket and the liner.

18. The riser assembly of claim 14 further including a rubber slip seal collar securing the liner and the jacket to the inner casing.

19. The riser assembly of claim 14 further including a seal between the adapter and an exterior surface of the inner casing for sealing therebetween.

20. The riser assembly of claim 14 further including:
 an internally toothed collet having a tapered external surface;
 a wedge member having a tapered surface that cooperates with the tapered external surface of the collet for gripping the inner casing upon imposition of an axial pullout force.

* * * * *